United States Patent Office 3,053,619
Patented Sept. 11, 1962

3,053,619
METHOD OF PRODUCING CERIUM TELLURITE
Gerhard Bayer, Hinteregg, Zurich, Switzerland, assignor to Owens-Illinois Glass Company, a corporation of Ohio
No Drawing. Original application Nov. 30, 1960, Ser. No. 72,568. Divided and this application Dec. 22, 1961, Ser. No. 168,293
3 Claims. (Cl. 23—50)

This invention relates to a new cerium tellurite, and to a method for its preparation.

This application is a division of copending application Serial Number 72,568, filed November 30, 1960.

An object of the present invention is to provide a new compound, a cerium tellurite.

Another object of the invention is to provide a method for the production of this new compound in crystalline form. Still another object of the invention is to provide a new yellow ceramic color or pigment. Other objects of the invention will become apparent from a study of the accompanying disclosure.

According to the present invention, I have now discovered a new crystalline tellurite of the formula:

$$CeTe_3O_8$$

This compound has a striking and intense yellow color.

According to the invention, the new compound can be prepared by mixing $TeO_2$ with $CeO_2$ in the ratio of 3 mols of the tellurium oxide to 1 mol of the cerium oxide, and carrying out a solid-state reaction. The ratio of the oxides should be substantially as stated, but higher or lower ratios can be employed; however, when so employed the tellurite compound is diluted with $CeO_2$ or $TeO_2$, as shown by X-ray powder diffraction data. In preparing the compounds, the reactants are intimately admixed in finely divided powder form; preferably the powders are 30 microns or smaller. The intimately admixed powders are compacted into a cohesive mass, and thereafter heat treated in a non-reducing, usually an oxidizing, atmosphere (e.g., air). Temperatures of firing are from about 600 to about 700° C., usually not above 650° C. The solid state reaction takes place during the firing, after which the compound is cooled to room temperature. Firing time is generally from 2 to 30 hours, usually 5 to 20 hours.

The compound $CeTe_3O_8$ was prepared in the manner just described, wherein the firing temperature was held within the range from 600–650° C. for 20 hours in an air atmosphere. The cerium tellurite had an intense yellow color. It was insoluble in water and dilute hydrochloric acid but soluble in strongly alkaline solutions. It was found to be stable up to a temperature of about 750° C., but above this temperature after prolonged heating the tellurium begins to volatilize as $TeO_3$.

The X-ray powder diffraction data are given in Table I. The lines for $CeO_2$ and $TeO_2$ were absent, indicating the substantial absence of the starting material reactants.

Table I

|  d (A.U.): | $I/I_0$ |
|---|---|
| 5.94 | 6.9 |
| 4.00 | 6.9 |
| 3.49 | 64.0 |
| 3.34 | 72.8 |
| 3.26 | 8.3 |

| d(A.U.): | $I/I_0$ |
|---|---|
| 3.11 | 100.0 |
| 2.90 | 22.1 |
| 2.78 | 43.3 |
| 2.68 | 7.6 |
| 2.28 | 4.0 |
| 2.23 | 4.5 |
| 2.11 | 12.9 |
| 2.04 | 21.1 |
| 1.98 | 30.5 |
| 1.84 | 14.1 |
| 1.77 | 11.5 |
| 1.73 | 20.7 |
| 1.67 | 6.6 |
| 1.628 | 12.0 |
| 1.612 | 8.1 |
| 1.555 | 9.0 |
| 1.387 | 5.0 |
| 1.305 | 4.5 |
| 1.178 | 4.5 |

The new yellow crystalline compound finds particular application because of its very desirable yellow color. It can be used in ceramic glazes, enamels, paints and dyes. The composition in powdered form can be incorporated as a powder in amounts from, for instance, 0.5 to 10% or even higher as coloring fillers in plastics, such as polyethylene or polystyrene.

As a specific example of a paint formulation incorporating the present colors, the following illustrates this use for the color:

| Ingredient— | Lbs. |
|---|---|
| $CeTe_3O_8$ | 300 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |
| Total | 994 |

As will be evident to those skilled in the art, various modifications of this invention can be made or followed in the light of the foregoing disclosure and discussion without departing from the spirit and scope of the disclosure or from the scope of the claims.

I claim:
1. A method of making the compound $CeTe_3O_8$ by solid-state reaction which comprises intimately admixing powders of $CeO_2$ and $TeO_2$, compacting the resulting admixture into a cohesive mass, and heating said mass at a temperature of from at least about 600° C. up to the temperature at which said compound begins to decompose at an undesirable rate.

2. A method according to claim 1, wherein the temperature is from 600 to 700° C.

3. A method of claim 2, wherein the molar ratio of $TeO_2$ to $CeO_2$ is substantially 3:1.

References Cited in the file of this patent
UNITED STATES PATENTS

| 2,946,752 | Jonker et al. | July 26, 1960 |
| 3,008,797 | Bither | Nov. 14, 1961 |